Figure 5:
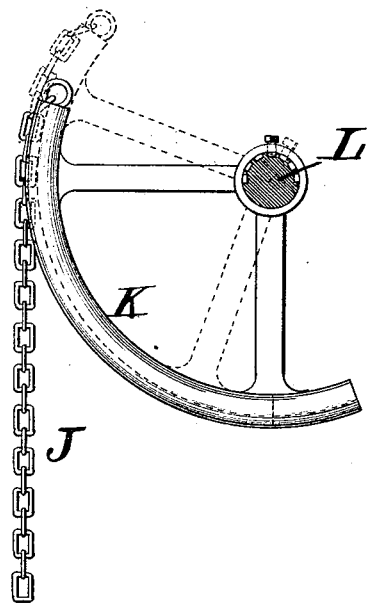

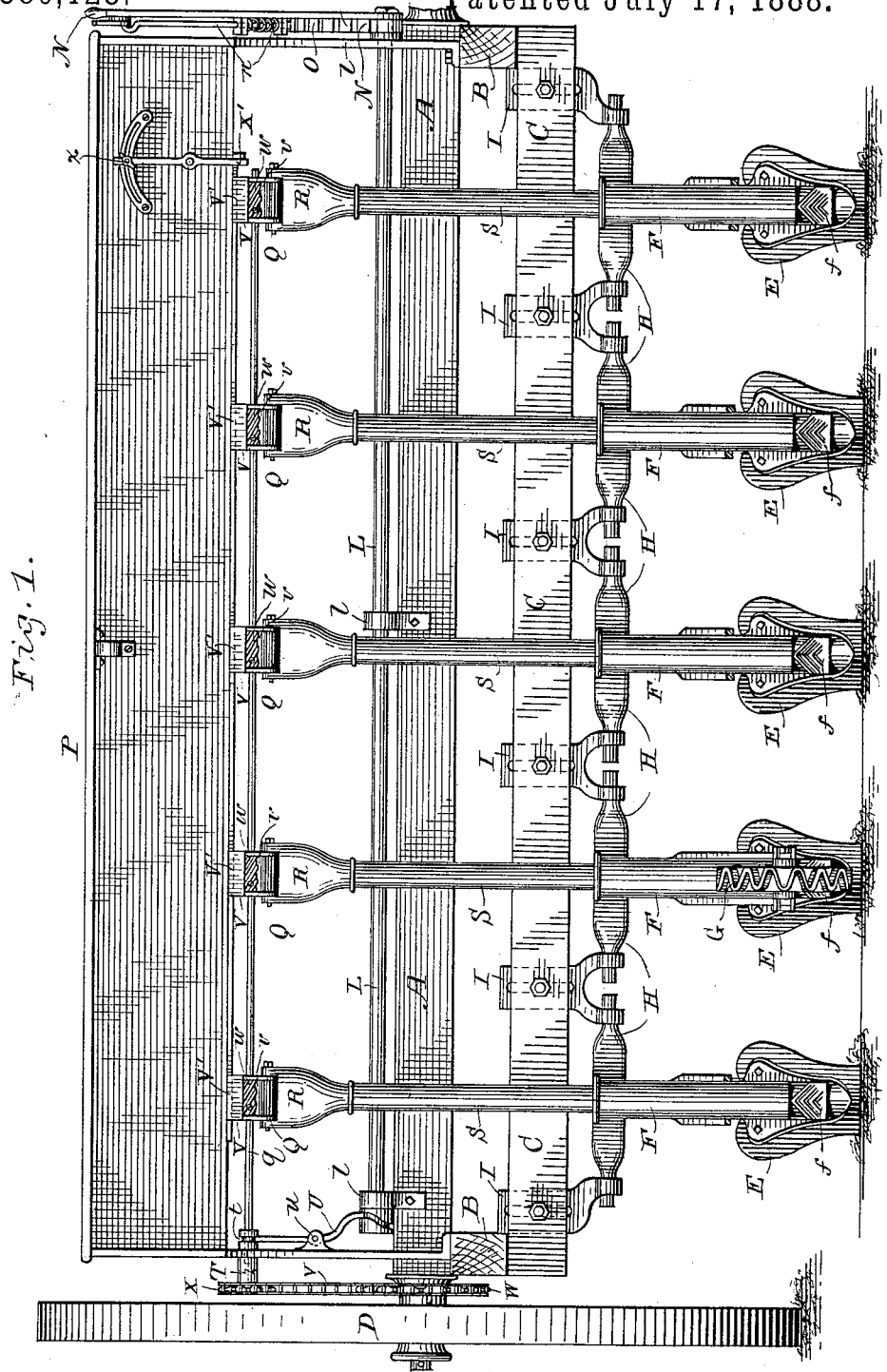

(No Model.) 3 Sheets—Sheet 2.
W. H. HOLLINGER & J. W. GILLETT.
GRAIN DRILL.
No. 386,128. Patented July 17, 1888.
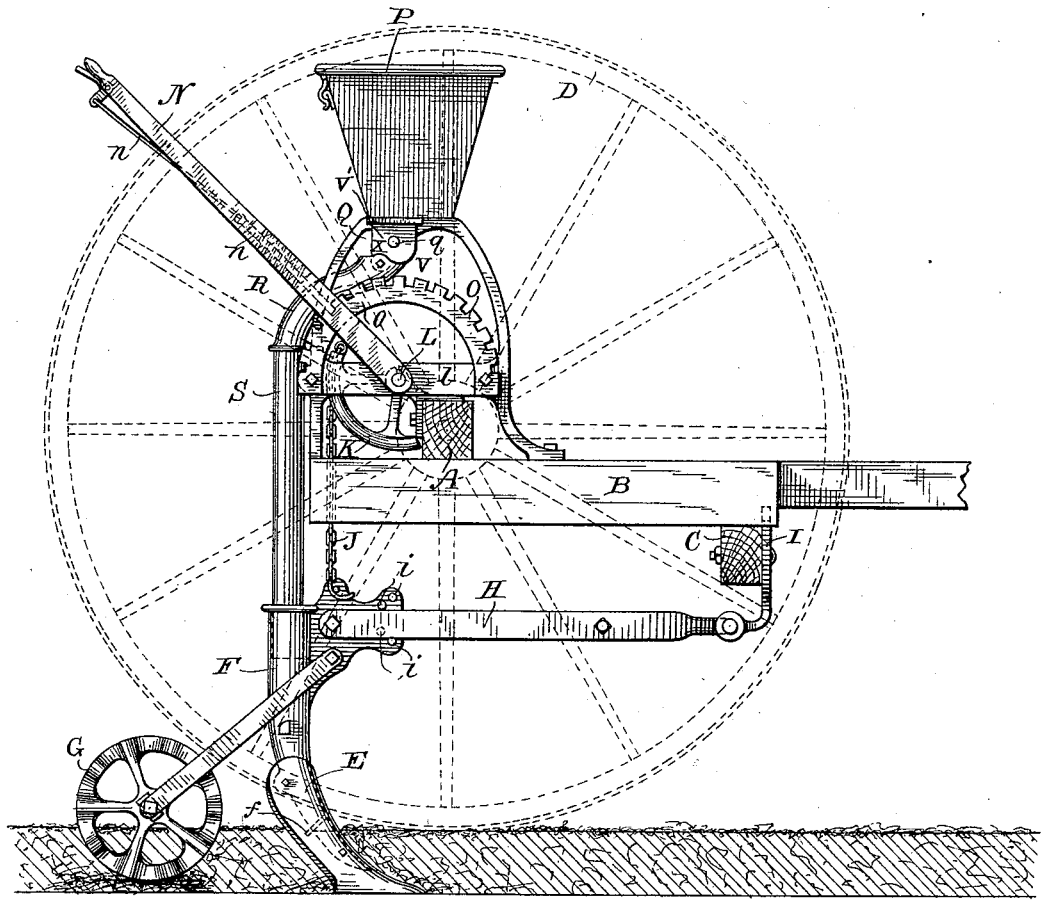
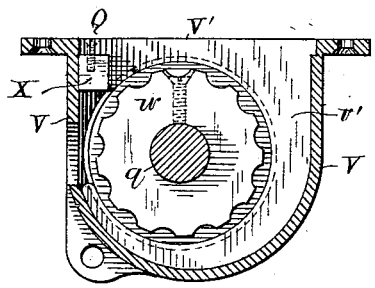
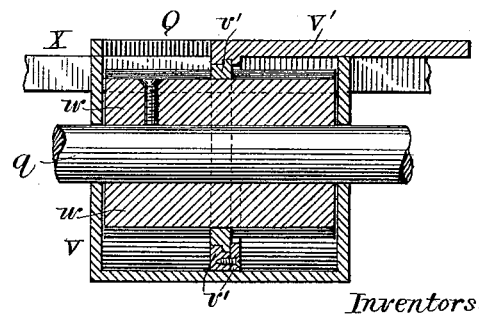

(No Model.) 3 Sheets—Sheet 3.

W. H. HOLLINGER & J. W. GILLETT.
GRAIN DRILL.

No. 386,128. Patented July 17, 1888.

UNITED STATES PATENT OFFICE.

WILLIAM HENRY HOLLINGER, OF HIAWATHA, AND JOSEPH WILLIAM GILLETT, OF WOODBINE, KANSAS.

GRAIN-DRILL.

SPECIFICATION forming part of Letters Patent No. 386,128, dated July 17, 1888.

Application filed March 18, 1887. Serial No. 231,424. (No model.)

*To all whom it may concern:*

Be it known that we, WILLIAM HENRY HOLLINGER and JOSEPH WILLIAM GILLETT, citizens of the United States, residing, respectively, at Hiawatha and Woodbine, in the county of Dickinson, and State of Kansas, have invented certain new and useful Improvements in Grain-Drills; and we do hereby declare the following to be a full, clear, and exact description of the invention, such as will enable others skilled in the art to which it appertains to make and use the same.

Our invention relates to grain-drills for planting or seeding small grain—such as wheat—and belongs more particularly to that class of such machines in which the grain is automatically fed by a force-feed to the drills or plows, which are arranged at the rear of the machine, and are connected by suitable hose or pipes with the discharge-openings of the feed-box.

The object of our invention is to improve the class of machines thus generally alluded to, to the end that the machine may be readily adapted for effective seeding, not only in good ground, but in uneven or trashy ground, that the grain may be put to the proper depth in the ground and be evenly distributed, and that when sown the grain will be protected alike from the cold and frost of winter and from the drought in summer. There are certain localities where our improved machine will be especially desirable, particularly the localities where the winter is severe and the dry season and drought very trying upon growing crops.

Our improved machine is so organized that in seeding the grain is evenly distributed in the bottom of the furrows made by the machine, with ridges of earth on either side, whereby the grain is protected from the action of cold or frost, while the furrows retain snow and moisture and alleviate in a large degree the trying action of the dry season.

Our invention consists in certain novel organizations and combinations of parts and devices in seeding-machines or grain-drills, and some of them may be used without the others. We will first describe in detail, by aid of the accompanying drawings, the preferred manner of organizing our several improvements, and will then distinctly recite at the close of this specification the subject-matter claimed herein as of our first invention.

In said drawings, Figure 1 is a rear view of our improved machine. Fig. 2 is an end view thereof. Figs. 3 and 4 are views of the force-feed apparatus; and Fig. 5 is a view in section through the rocking rod, having the independent lifting-pulley adjustably mounted thereon.

The main frame of the machine consists of a cross or axle beam, A, mounted near its ends upon longitudinal end beams, B B, which are in turn mounted at their forward ends upon, or have securely bolted thereto, a cross-beam, C. A suitable draft-frame is also provided, extending forward at the front of the machine; but this need not be described or illustrated, as it is of well-known construction, or may be attached to the main frame in any desired way.

The ends of the main or axle beam A are extended outward at the sides of the machine and fitted to receive the carrying-wheels D D, which are mounted on the axle-beam, so as to support the machine and its working parts.

The plows E, of which there may be any desired number—say five or seven—between the wheels, are preferably located or set about fourteen inches apart from center to center, (more or less,) and they are double-mold-board plows, so as to throw open furrows, the dirt being turned to both the right and left hand to form ridges in the soil. The plows are preferably of the size to throw about six inches of earth about three inches to either side, thus making an open furrow in which the grain is evenly sown, as will presently appear. Each of the plows E is connected with the main frame, so as to be independently adjustable, whereby the plows of the machine may be properly adjusted to suit the particular lay of the land in which they are to work, and whereby, also, the depth to which the plows are to work in the ground may be regulated. Said plows E are securely bolted to the front sides of the lower ends of the tubular, and usually cast-metal, boots F, the lower ends of which open just behind the plow, so as to drop the fed grain in the open furrows as the machine is drawn along by the team. Near the lower end of said boots F we fix a spreader, *f*, which preferably consists of an inclined delivery-plate secured in the lower end of the boot, or cast therein if said boot be of cast metal, as is usual. By means of the spreader we are enabled to evenly distribute the grain over the bottom of the furrow—a very desirable result in this class of machines. We prefer the top surface of the spreader, upon which the grain drops, to be corrugated, as clearly shown in Fig.1, which more effectually spreads the grain.

Hinged, hung, or pivoted to each boot or casting F is a crimped press-wheel, G, which operates and revolves behind the plow to thoroughly pulverize the soil and cover the fed grain. The press wheel is loosely hung to the boot or casting by the loosely-swinging link-connections G', so that it acts by its weight only upon the soil as the machine is drawn along, thus accommodating itself to the soil and furrow, and constituting an effective and even pulverizing and covering device, which would not be the case with a rigidly-connected wheel in the rear of the plow. By crimping the press-wheel, as shown, it thoroughly pulverizes the soil and does not clog, and, what is very important, it acts by the crimped periphery to thoroughly cover the grain, the alternate crimped portions, as the wheel revolves, throwing by their inclined surfaces the dirt thoroughly over the grain in the bottom of the furrow.

The upper end of each plow carrying boot F is connected by a drag bar or beam, H, with the front cross-timber, C, of the main frame, and said drag bar or beam is preferably a bifurcated or divided one, the rear ends of which are securely bolted to the front side of the boot, and made rigid therewith by means of the usual "break-pins" *i i*. The front ends of said drag-bars are fitted pivotally in boxes or sockets formed in vertically-adjustable plates or castings I, said plates being vertically adjustable in order to regulate the inclination of the plows in the soil, and consequently the depth at which they will work therein in seeding the grain.

The upper ends of the boots F are hung or connected to the rear end or axle beam, A, of the main frame by means of chains, links, or pivotal connections J, (preferably chains,) jointed or connected at their lower ends to the upper ends of the boots, and at their upper ends to sections of independently-adjustable pulleys K. There is an independent pulley K for each boot and plow, and it is mounted adjustably upon a transverse and, preferably, tubular rocking rod, L. Each plow is therefore hung by its chain independently, and is independently adjustable vertically by its adjusting-pulley K, and is also self-adjusting within the range permitted by its chain; and in the advance of the machine each plow is permitted to seek its proper working level, due to its adjustment by means of the adjusting-connections I and K. Each pulley K is keyed upon its rocking rod L in such a way—as by a pinch-screw, for example—as to permit it to be independently adjusted on said rod and securely fastened thereto, and so as also to be movable with said rod L when it is rocked in its bearings.

In order to provide means whereby the entire set of plows may be simultaneously raised out of the ground or lowered therein, we secure upon the end of the transverse rocking rod L, at the right-hand end of the machine, preferably, a main lifting-lever, N, by which the rod L may be rocked in its bearings *l l l* on the machine to raise or lower all the plows together. Said lever is provided with a detent, *n*, to engage a toothed sector-plate, O, rigidly mounted at the end of the main frame of the machine, (and by preference being bolted to the legs of the seed-hopper, as shown,) whereby the lever N may be locked in the desired position with the plows raised or lowered.

We have thus described the construction and adjustable connections and supports of the plows.

The feed box or hopper P is mounted on the main frame and is fitted at its lower end with a force-feed wheel, Q, whereby the grain is positively and automatically fed to and through the boots F, and upon the spreaders thereof, to the furrows. The openings of the force-feeding device are connected by feed-spouts R and rubber tubing S with the tubular boots F, as usual. In order to throw the grain-feeding mechanism out of operation when the plows are elevated out of the ground, or not at work, and into operation when the plows are lowered and at work, we provide a clutch-operating connection, T, between the rocking lifting-rod L and the rotary force-feed shaft *q*. This connection preferably consists of a bent lever, U, pivoted at *u*, and fitted at one end to engage a cam-groove in the end of the rocking lifting-rod L and at the other end to engage an annular groove, *t*, in a sliding section of the clutch mechanism T, whereby, as the rod L is turned in lifting the plows, the lever U will be rocked on its pivot to disengage the clutch-sections, and thereby stop the rotation of the feed-bar of the force-feed apparatus, the engagement of said clutch and the driving-connection being effected by the rocking of the rod L in the opposite direction, or to lower the plows for operation.

The force-feed mechanism is operated by a chain, V, running from a sprocket-wheel, W, on one of the main driving and supporting wheels of the machine, over a sprocket-wheel, on the end of the rotary feed-bar *q* of the force-feed apparatus.

Any form of force-feed mechanism that is suitable may be employed with our machine; but we prefer the improved arrangement shown in the accompanying drawings, wherein the force-feed apparatus consists of the rotary bar *q*, fitted in each feed-box V, with a grooved feed-wheel, *w*, secured to the rotary feed-bar by a pinch-screw, for example, so that as said feed-bar q rotates all the grooved feed-wheels w revolve when said bar is driven by the driving chain from the main driving-wheel D. The feed-boxes V have closed casings, cast in one piece preferably, with lateral openings for the passage of the feed-bar q, there being at the rear sides, near the bottom of said boxes, a suitable outlet feed-opening, v, communicating with the upper ends of the feed-spouts R of the machine. The tops of the feed-boxes V are sliding covers or tops V', bolted to a bar, X, which connects all the sliding covers of the several feed-boxes, and by the endwise movement of which the feed of the seed may be regulated, inasmuch as each top V' is the means of regulating the access of the seed in the hopper to said feed-boxes V. The feed of the seed will consequently depend on how much the tops of the feed-boxes are opened, and by closing them tight the feed may be shut off altogether.

The cut-off bar X may be moved endwise to any desired extent, in regulating the feed, by means of the lever X', and locked, when adjusted, by a locking-nut, x, or some such mechanical device. In order to enable the sliding cover to control the feed of its box V, it is fitted with a curved arm, v', which extends around to the lower edge of the feed-opening v and snugly fits the circumference of the feed-wheel, whereby, as the cover V' is adjusted, it carries the curved arm v' with it and only allows the passage of the grain to the spout through the space in the feed-box V between the wall of the box and said arm v', below the opening made by sliding the cover in the top of the box.

The feed-wheels w are spirally grooved, as shown, and in order to provide for seeding all kinds of small grain the grooves are quite deep—say an eighth of an inch deep, (more or less.) To prevent the grain from working through the grooves in the wheels w past the stop-arm v', we fit said arm with a revolving washer having teats or lugs fitting the grooves in the wheel. This effectually prevents the passage of grain past the curved stop-arm v' of the sliding cover V'.

The washer may be fitted at its circumference by a tongue or rim fitting an annular groove in the curved stop-arm v'.

Having thus particularly described the best way now known to us of embodying our improvements in a grain-drill, we state our claims herein to be as follows, first premising that the details of the improvements may be varied, some of which will readily suggest themslves to skillful mechanics.

We claim—

1. The combination of the plow-carrying boot, the crimped wheel in rear of said boot, to pulverize the soil and cover the grain fed to the furrow in rear of said boot, and the loosely-hung link-connection between said boot and said crimped wheel, whereby the wheel is loosely suspended or connected and accommodates itself to the soil and furrow as the machine is drawn along, substantially as described.

2. The combination of the series of plow-carrying boots, the adjusting and supporting chains, and the supporting pulleys or surfaces for said chains adjustable independently, whereby the plows may be adjusted vertically independently, so as to work in the desired relation, as herein described.

3. The combination, substantially as hereinbefore set forth, of a series of plow-carrying boots, a series of independent adjusting devices and connections for said boots, whereby each may be independently set or hung vertically, as desired, and a lifting-lever common to said boots, whereby they may be all lifted or raised vertically simultaneously, as herein described.

4. The combination of the series of plow-carrying boots, the series of independent adjusting devices carried by a rock shaft or rod, the connections between said boots and said independent adjusting devices, whereby each boot may be set or hung as desired, and a lifting-lever to rock said shaft or rod to raise or lower all of said boots together, as herein described.

5. The combination of the series of plow-carrying boots, the double-mold-board plows attached thereto, the drag-bars, respectively connected at one end to said boots and at the other end to vertically-adjustable plates on the front of the machine-frame, the series of independent adjusting devices carried by a rock shaft or rod, the connections between said boots and said independent adjusting devices, whereby each plow may be set or hung as desired, and a lifting-lever to rock said shaft or rod to raise or lower all of said plows together, substantially as herein described.

6. The combination, substantially as hereinbefore set forth, of the series of plow-carrying boots jointed to the frame of the machine by drag-bars, the series of independent adjusting devices for said boots, the supporting connections or chains between said independent adjusting devices and said boots, the rock shaft or rod carrying said adjusting devices, and the main lifting-lever to rock said shaft.

In testimony whereof we affix our signatures in presence of two witnesses.

WILLIAM HENRY HOLLINGER.
JOSEPH WILLIAM GILLETT.

Witnesses:
  A. B. HOFFMAN,
  J. H. HOFFMAN.